Dec. 19, 1967   R. B. JOHNSON ET AL   3,358,892
SPROCKET-TYPE MECHANISM FOR MOVING PHOTOGRAPHIC FILM
Filed April 26, 1965   3 Sheets-Sheet 2

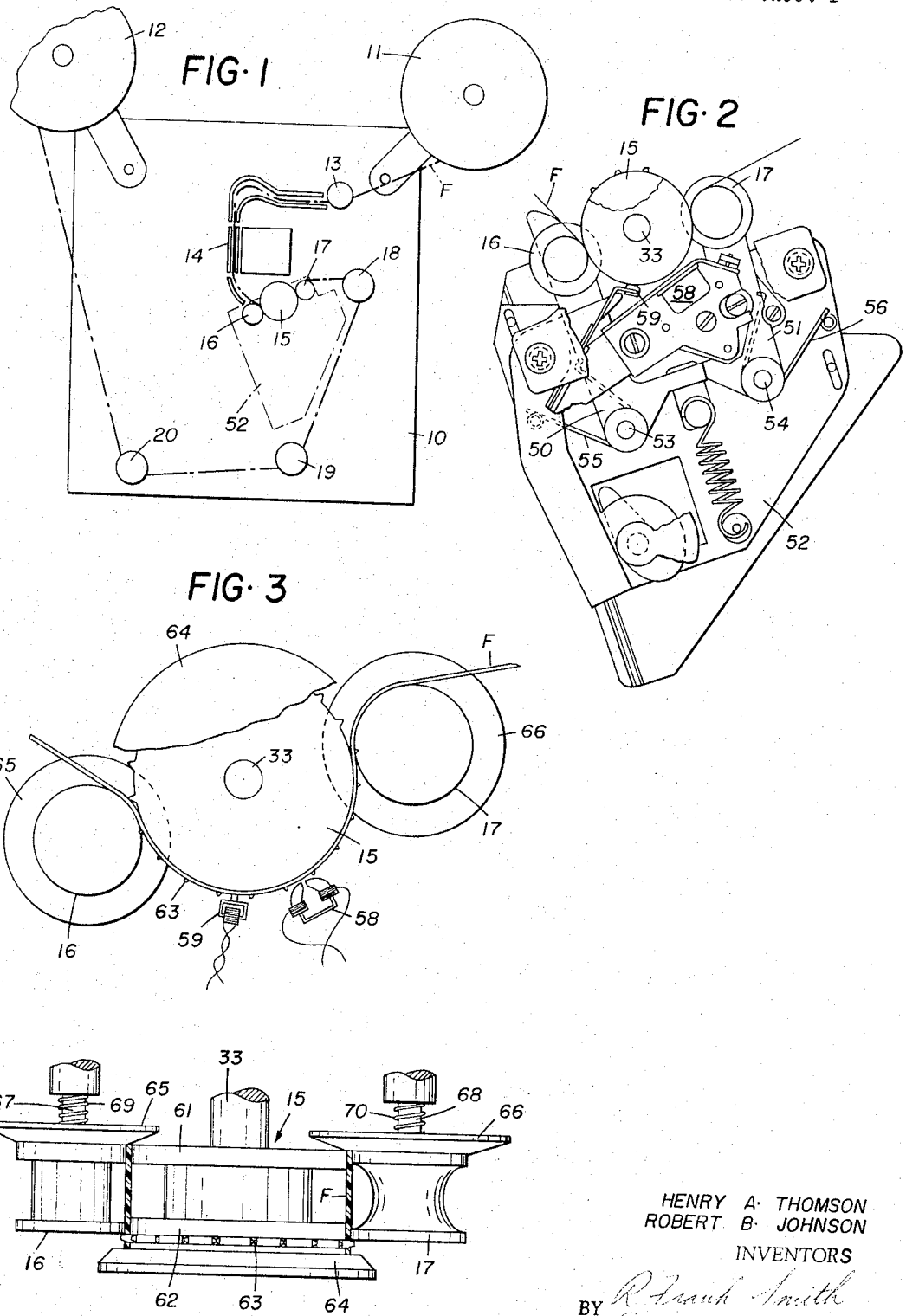

HENRY A. THOMSON
ROBERT B. JOHNSON
INVENTORS

BY R. Frank Smith
Lloyd F. Seebach

ATTORNEY AND AGENT

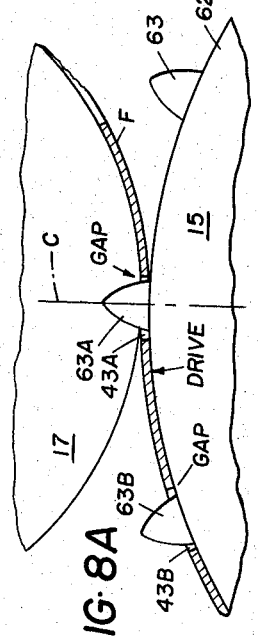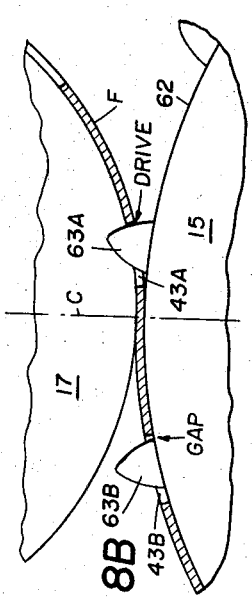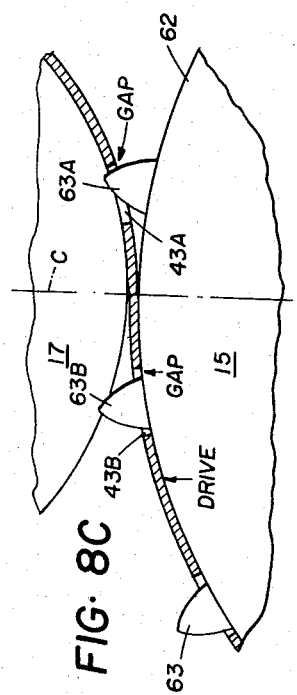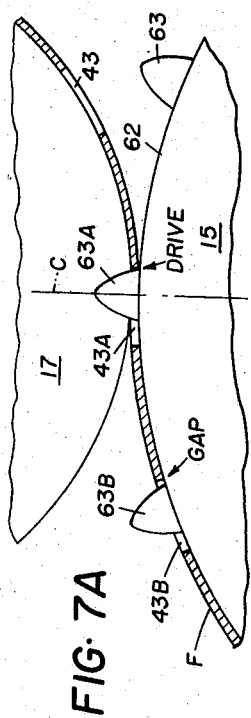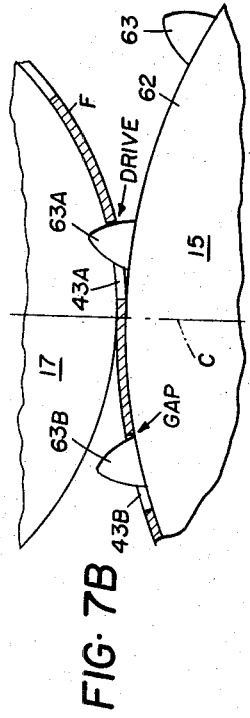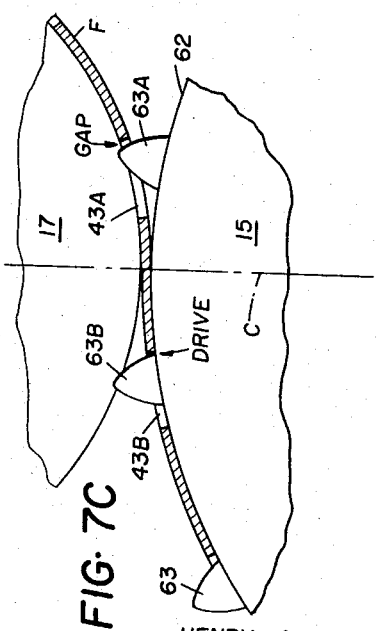
HENRY A. THOMSON
ROBERT B. JOHNSON
INVENTORS
ATTORNEY AND AGENT

United States Patent Office 3,358,892
Patented Dec. 19, 1967

3,358,892
SPROCKET-TYPE MECHANISM FOR MOVING PHOTOGRAPHIC FILM
Robert B. Johnson, Rochester, N.Y., and Henry A. Thomson, Denver, Colo., assignors to Eastman Kodak Company, Rochester, N.Y., a corporation of New Jersey
Filed Apr. 26, 1965, Ser. No. 450,643
14 Claims. (Cl. 226—85)

The present invention relates to photographic apparatus such as cameras and projectors and more particularly to a mechanism for moving a film web with or without a sound track at a substantially constant linear velocity, which mechanism can be positioned relatively close to the film gate in such camera or projector.

It is conventional practice in such web feeding mechanisms to thread a film strip, having a sound reproducing track, through a film gate and then to form a loop of film and finally thread the film strip around a sound drum and a sprocket. In reproducing systems of this kind, a transducer head is customarily mounted adjacent the drum and in contact with a sound track on the film. Such a system requires that the drum and transducer head be positioned at a distance from the film gate that is equivalent to substantially 56 image frames in the case of 8-mm. film. This relatively long image-to-sound separation was established at an early date as a sound separation to provide sufficient space in which the sound drum and sprocket mechanisms could be arranged.

The pitch, that is, center-to-center distance, of the perforations in a film strip vary due to the manner in which the film strip was perforated and/or the inherent shrinkage of the film strip due to age, humidity conditions, etc. Such variation in pitch causes erratic movement of the film strip by the sprocket, thereby producing what is usually referred to as "flutter" in the case of sound apparatus. The ratio between the unsteady film velocity component and the steady velocity component is usually defined as the measure of unsteadiness which is commonly referred to as "flutter." Attempts have been made to improve the quality of sound reproduction in such a system by adding a mechanical filter comprising a flywheel and a suitable damping system that are coupled to the sound drum, but this increases the cost and complexity of the system.

With a system such as that just described, automatic threading of the film strip in a camera or a projector becomes quite complex in that an additional threading path must be provided, namely, from the sound drum to the sprocket. Also, editing of such a film strip presents a problem because of the large image-to-sound separation.

A primary object of this invention is to move a perforated web at a substantially constant linear velocity.

Another object of the invention is to provide an improved system for moving a film strip having a sound-reproducing track, such that the image-to-sound separation is greatly reduced without detracting from the quality of the sound reproduction.

Still a further object of the invention is to provide a system for moving such film strip past a transducer head that imparts a nearly constant linear velocity to the film strip, so that the recorded or reproduced sound is less subject to "flutter."

And yet another object of the invention is to provide a system for moving such film strip past a transducer head by means of a relatively simple structure to provide an optimum sound reproduction.

These and other objects and advantages will be readily apparent to those skilled in the art by the following description of a preferred embodiment of the invention.

The above-mentioned objects have been attained by the present invention, which eliminates any need for the mechanical filter in a web feeding system. A record/play head is positioned in sound transducing relationship to the film strip on a sprocket where the sound reproduction takes place while the film strip is being moved continuously thereby. The invention is applicable, for example, to double 8-mm. film, 16-mm. film, or any other film size wherein a sound track is arranged along a longitudinal edge of a film strip having spaced perforations along the same or the other longitudinal edge. Further, the invention can be used for magnetic or optical sound recording, as in a camera, or for magnetic or optical sound reproduction, as in a projector. The term "sound reproducing" as used herein is therefore meant to include sound recording (record) or sound reproduction (play).

According to one form of the invention, a sprocket is arranged beyond a film gate in the direction of movement of a film strip such that the image-to-sound reproduction is within 18 frames. The film strip is threaded between the sprocket and a pressure roller, around a portion of the sprocket and under an erase head and a record/play head, and finally passes around another pressure roller into an outgoing path to a take-up reel. A drive mechanism provides a uniform velocity drive to the sprocket. The sprocket is provided with a pair of spaced peripheral surfaces which engage the opposite longitudinal edges of the film strip. One surface of the sprocket has a plurality of circumferentially-spaced teeth for entering respective perforations in the film strip. The sprocket has an edge guide flange and both pressure rollers are biased into engagement with the sprocket and spring-loaded lightly in an axial direction so as to urge the film strip against the flange of the sprocket.

In the present invention, the pitch of the teeth on the sprocket is made substantially equal to that of the perforations in a raw or unshrunk film strip. Due to the action of the pressure rollers and the relatively large wrap-around of the film strip on the sprocket, an unshrunk film strip tends to be driven by surface friction but at a speed somewhat less than the linear speed normally required. Under this condition, the drive is always at the root of the sprocket tooth except for any random errors in the pitch of the perforations and the teeth. When a film strip having moderate shrinkage is driven by the same sprocket, the drive for part of the time is at the tooth root to give maximum velocity. At the line of contact where the film strip leaves the sprocket and enters an outgoing path, the driven edge of the film perforation rides up the tooth resulting in a gradually decreasing film velocity as the film strip slips back at a controlled rate until the leading edge of the succeeding perforation is contacted by the leading edge of the next tooth. At this point, the film strip is again moved at a maximum velocity and the average velocity is determined by the relative proportion of these two conditions.

The film strip is therefore advanced by the surface friction between the film strip and the pair of spaced surfaces on the sprocket against which the film strip is held by the pressure rollers and by successive sprocket teeth engaging the leading edges of their respective perforations. As a result, only one tooth at a time is actually advancing the film strip, and the transfer of movement of the film strip from one tooth to the next occurs only when the perforation engaged by the one tooth is at least partially in the outgoing path, that is, substantially aligned with the line of contact of the pressure roller with the film strip at the outgoing path, or already in the outgoing path. Under optimum conditions with an unshrunk film strip, this transfer of movement takes effect when the engaged perforation is substantially aligned with the line of contact of the pressure roller with the film strip at the outgoing path, whereas with a film strip having shrinkage, the transfer occurs when the engaged perforation is well past that line of contact. By this arrangement a substantially constant linear velocity is imparted to the film strip.

Reference is now made to the accompanying drawings wherein like reference numerals and characters designate like parts and wherein:

FIG. 1 is a diagrammatic side elevational view of a projector showing the invention incorporated therein;

FIG. 2 is a detail front view of the mechanism for moving the pressure rollers relative to the sprocket;

FIG. 3 is a detail view showing the relationship of the pressure rollers, erase head and record/play head to the sprocket;

FIG. 4 is a plan view of the various elements shown in FIG. 3.

Figure 5:
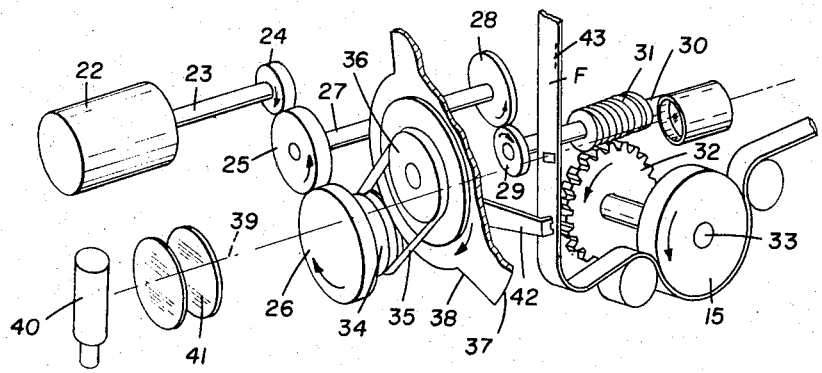

FIG. 5 is a diagrammatic perspective view of the principal elements of a motion picture projector showing the relation of the sprocket to the other elements of the projector; and FIGS. 6A–C, 7A–C and 8A–C are detail views on an enlarged scale of the sprocket and the pressure roller at the outlet path showing the transfer of advance of the film strip by successive teeth on the sprocket in accordance with film strips having different amounts of shrinkage.

Reference is now made to FIG. 1 and FIG. 5 of the drawings wherein the essential elements of a motion picture projector are shown. It is to be understood that while the invention is disclosed and described with respect to a projector, the same principle and structure is applicable to a motion picture camera. The film strip F is threaded through a film path in a projector 10 from a supply reel 11 to a take-up reel 12, the path being essentially around a sprocket or guide roller 13, through the film gate 14, and around a sprocket 15 against which the film strip is held by rollers 16 and 17. From the roller 17, the film strip passes around a group of guide rollers 18, 19 and 20 to the take-up reel 12.

A motor 22 has a shaft 23 on which a gear 24 is fixed, the latter meshing with a gear 25 which, in turn, imparts rotation to a gear 26, the gear 25 being fixed to a shaft 27 which also carries a gear 28. The gear 28 meshes with a gear 29 on shaft 30 which carries a worm 31 that meshes with worm wheel 32, the latter imparting rotation of a uniform and constant velocity to the sprocket 15 on shaft 33. A pulley 34 is mounted on or fixed to gear 26 and through a belt 35, which encircles a pulley 36, rotates a shutter 37 secured or formed integral with pulley 36. The shutter 37 is provided with an opening 38 that is moved across the optical axis, designated by the line 39, to intermittently interrupt the beam of light from a source 40 and condenser lens system 41. The film strip F is moved intermittently past the optical axis 39 by means of a claw member 42 that successively engages the spaced perforations 43 disposed along one longitudinal edge of the film strip. The claw member 42 is moved vertically and in and out of the perforations 43 in the film strip F in a well known manner to intermittently move the film strip. It can be readily appreciated that the film strip is therefore moved intermittently by claw member 42 at or in the vicinity of film gate 14 and continuously by the sprocket 15.

With reference particularly to FIG. 2, each of the rollers 16 and 17 is mounted on an arm 50 and 51, respectively, and these arms are pivotally mounted on a plate 52 at 53 and 54, the arms being respectively biased toward the sprocket 15 by springs 55 and 56. A more detailed disclosure and description of this mechanism can be obtained by reference to co-pending U.S. application Ser. No. 437,887 filed Mar. 8, 1965.

A record/play head 58 and an erase head 59 are also mounted on plate 52 for pivotal movement into a sound transducing relationship with respect to the film strip F on the sprocket 15, the sound track being arranged along the other longitudinal edge of the film strip.

As shown in FIG. 4, sprocket 15 is provided with a pair of peripheral surfaces 61 and 62 against which the film strip F is held by rollers 16 and 17 which, as seen in FIG. 3, are arranged generally opposite one another so that the film strip is wrapped around approximately one-half of the periphery of sprocket 15. A plurality of sprocket teeth 63 extend from surface 62 and have a pitch corresponding to that of the perforations in an unshrunk film strip. The sprocket 15 carries an edge guide flange 64 against which the film strip is urged by the flanges 65 and 66 on the rollers 16 and 17, respectively. The rollers 16 and 17 are freely rotatable on their respective shafts 67 and 68 and urged axially toward sprocket 15 by springs 69 and 70. The rollers 16 and 17 therefore serve as first and second means for holding the medium or film strip F in engagement with surfaces 61 and 62 at sprocket 15 and for urging the medium or film strip in a lateral direction against flange 64.

The operation of the invention is disclosed in FIGS. 6A–C, 7A–C, 8A–C with respect to a film strip having no shrinkage and two other film strips, each of which has a different amount of shrinkage. Throughout the following description relating to FIGS. 6A–8C, the same numerals and characters are used in order to facilitate following the relationship of each of the sprocket teeth to its respective film perforation.

Figure 6A:
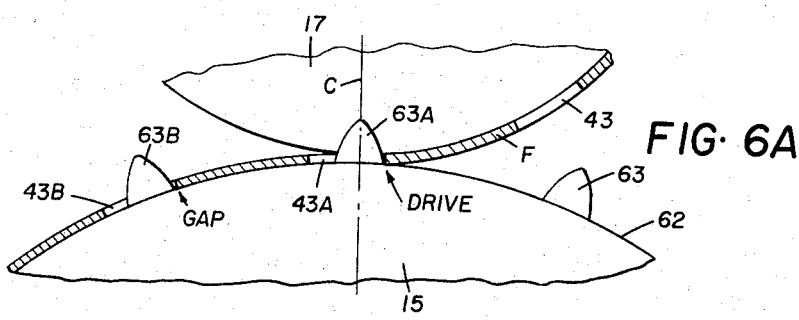
Figure 6B:
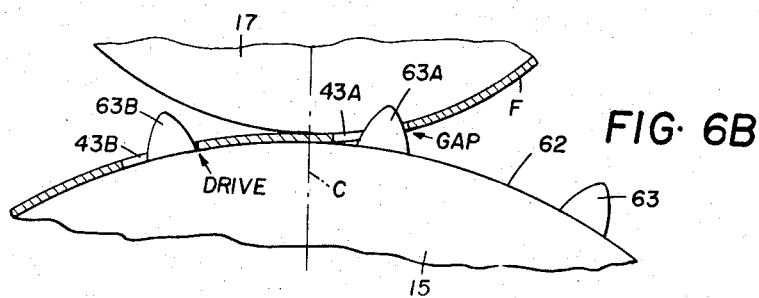
Figure 6C:
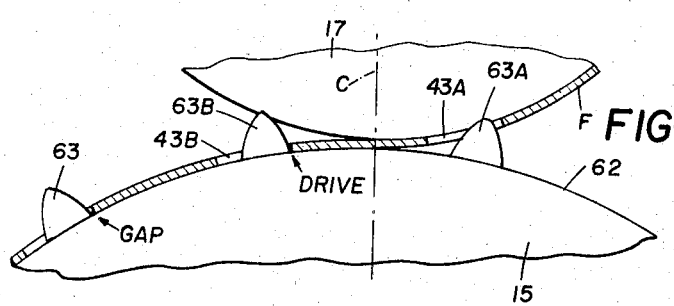

In FIGS. 6A–6C, the film strip F can be considered as raw film having no shrinkage and in which the perforations 43 have the same pitch as the sprocket teeth 63. The driving action between a film perforation and a sprocket tooth occurs in the vicinity of the line of contact C which is that line where roller 17 engages the film strip F on the surfaces 61 and 62 of sprocket 15. It will be noted from FIG. 6A that at the line of contact C, roller 17 provides the outlet path for the film strip F to the take-up reel 12. Due to the action of the pressure roller 17 and the relatively large wrap-around of the film strip on the sprocket, the film tends to be moved by surface friction but at a speed somewhat less than the normal linear speed required. For unshrunk film the movement is primarily at the root of one of the teeth and theoretically drives at this point at all times. It will be noted in FIG. 6A that tooth 63A is substantially aligned with the line of contact C and is in engagement with the leading edge of its perforation 43A and therefore moving the film strip in conjunction with the surface friction between the film strip and the surfaces 61 and 62. Tooth 63B is not moving the film strip in that a gap exists between this tooth and the leading edge of its respective perforation. Tooth 63A continues to drive until it has moved just slightly past line C, see FIG. 6B, at which time a gap occurs between tooth 63A and the leading edge of its perforation, but the following tooth 63B is then in engagement with the leading edge of its perforation to pick up and continue the movement, see FIG. 6C.

In FIGS. 7A–7C the relationship between the engaging tooth 63A and its respective perforation 43A is shown for a film strip having a moderate amount of shrinkage. For part of the time the drive is at the root of the tooth 63A since it is in engagement with the leading edge of its perforation 43A so that a maximum velocity is attained. As in the case of unshrunk film, a gap exists between tooth 63B and the leading edge of its perforation 43B, see FIG. 7A. At the line where the film strip leaves the sprocket, that is, line C, the leading edge of the perforaion 43A starts to ride up the tooth 63A resulting in a gradually decreasing velocity and the film strip, in effect, slips back at a controlled rate, see FIG. 7B. This slippage occurs or takes place until the edge of the succeeding perforation 43B is contacted by the tooth 63B, with perforation 43A then in the outlet path, see FIG. 7C. At this point, the film strip is again being moved at a maximum velocity. The average velocity is therefore determined by the relative proportion of these two conditions.

At some point as the film shrinkage increases, the reduction of velocity as defined by the tooth profile falls to a value equal to the velocity of the surface friction drive and a different set of conditions arises. In FIGS. 8A–8C, the film strip F in the first instance, see FIGS. 8A and 8C, is being moved by the sprocket surfaces 61 and 62 and no teeth are in contact with their perforations. This speed is below the average speed required by the film pitch and the film falls back relative to the teeth until contact is established with tooth 63A, see FIG. 8B. This contact occurs in the outlet path so that it occurs at a point partly up the tooth which provides less than maximum velocity. Thus, only sufficient additional velocity is imparted to the film to bring the speed to the correct value.

By the system described above, the maximum and minimum velocities at which the film strip is moved are limited and both extremes of velocity do not occur in any one length of film. Good "flutter" performance can be achieved from a range of shrinkages up to the point that the average required velocity falls below that of the surface drive velocity. This point occurs at about one percent shrinkage in the film strip and is usually the maximum shrinkage encountered.

From the above description it can be readily appreciated that movement of the film strip is effected by both the surface friction between the film strip and the pair of surfaces 61 and 62 of the sprocket 15 and each successive one of the teeth on the sprocket engaging the leading edge of its respective perforation in the vicinity of the line of contact between the roller 17 and the film strip on sprocket 15. The transfer of movement of the film strip from the engaging or driving tooth to the next and successive tooth, depending on the amount of film shrinkage, can occur when the engaged perforation is substantially aligned with the line of contact or past the line of contact and in the outgoing path.

The invention has been described in detail with particular reference to a preferred embodiment thereof, but it will be understood that variations and modifications can be effected within the spirit and scope of the invention as described hereinabove and as defined in the appended claims.

The embodiments of the invention in which an exclusive property or privilege is claimed are defined as follows:

1. A system for moving with a substantially constant linear velocity a web having spaced perforations adjacent at least one longitudinal edge thereof, the perforations having a pitch substantially equal to or less than a predetermined pitch, comprising in combination:
   a rotatable member about which the web is adapted to be at least partially wrapped in frictional engagement therewith, said member having a peripheral surface and a plurality of circumferentially-spaced teeth extending from said surface for entering the perforations in the web, said teeth having a pitch corresponding substantially to the predetermined pitch;
   means for rotating said member at a substantially constant velocity;
   first means positioned adjacent said rotatable member for guiding the web into engagement with said member; and
   second means positioned adjacent said rotatable member generally opposite said first means for guiding the web into an outgoing path;
   said second means cooperating with said first means to urge a portion of the web into frictional engagement with said surface and to establish a predetermined tension in the web portion, whereby movement of the web is effected by surface friction between the web and said surface and by successive ones of said teeth engaging the leading ends of their respective perforations, the transfer of movement of the web by one tooth to the next tooth occurring when the perforation engaged by said one tooth is at least partially in the outgoing path of the web and differences in the pitch of said teeth and the perforations being compensated for by relative frictional slippage between the web portion and said surface.

2. A system in accordance with claim 1 wherein the web is wrapped in frictional engagement around approximately one-half of said peripheral surface.

3. A system in accordance with claim 1 wherein said first and second means each comprise a roller biased into engagement with the web on said rotatable member.

4. A system for moving with a substantially constant linear velocity a web having spaced perforations adjacent at least one longitudinal edge thereof, the perforations having a pitch substantially equal to or less than a predetermined pitch, comprising in combination:
   a rotatable member about which the web is adapted to be at least partially wrapped in frictional engagement therewith, said member having a peripheral surface and a plurality of circumferentially-spaced teeth extending from said surface for entering the perforations in the web, said teeth having a pitch corresponding substantially to the predetermined pitch;
   means for rotating said rotatable member at a substantially constant velocity;
   first means positioned adjacent said rotatable member for guiding the web into engagement with said peripheral surface; and
   second means positioned adjacent said rotatable member generally opposite said first means for guiding the web into an outgoing arcuate path;
   said second means cooperating with said first means to urge a portion of the web into frictional engagement with said surface and to effect a predetermined tension in the web portion whereby when the web perforations have a pitch that is less than the predetermined pitch, movement of the web is effected by surface friction between the web and said surface and by successive ones of said teeth engaging the leading ends of their respective perforations, the transfer of movement of the web by one tooth to the next tooth occurring as a result of relative frictional slippage between the web portion and said surface when the perforation engaged by said one tooth is in the outgoing path.

5. A system in accordance with claim 4 wherein the web is wrapped in frictional engagement around approximately one-half of said peripheral surface of said rotatable member.

6. A system for moving with a substantially constant linear velocity a web having spaced perforations adjacent at least one longitudinal edge thereof, the perforations having a pitch substantially equal to or less than a predetermined linear pitch, comprising in combination:
   a rotatable member about which the web is adapted to be at least partially wrapped in frictional engagement therewith, said member having a peripheral surface and a plurality of circumferentially-spaced teeth extending from said surface for entering the perforations in the web, said teeth having a pitch corresponding substantially to the predetermined pitch;

means for rotating said member at a substantially constant velocity;

first means positioned adjacent said rotatable member for guiding the web into engagement with said member; and second means positioned adjacent said rotatable member generally opposite said first means for guiding the web into an outgoing arcuate path;

said second means cooperating with said first means to urge a portion of the web into frictional engagement with said surface and to effect a predetermined tension in the web portion, whereby when the web perforations have a pitch corresponding substantially to that of said predetermined pitch, movement of the web is effected by surface friction between the web and said surface and by successive ones of said teeth engaging the leading edges of their respective perforations, the transfer of movement of the web by one tooth to the next tooth occurring when the perforation engaged by said one tooth is in the outgoing path.

7. A system in accordance with claim 6 wherein the web is wrapped around approximately one-half of said peripheral surface of said rotatable member.

8. A system for moving with a substantially constant linear velocity a filmstrip having spaced perforations adjacent at least one longitudinal edge thereof, the perforations having a pitch substantially equal to or less than a predetermined pitch, comprising in combination:

a rotatable sprocket about which the filmstrip is at least partially wrapped in frictional engagement therewith, said sprocket having a pair of spaced peripheral surfaces, a plurality of circumferentially-spaced teeth extending from one of said surfaces for entering the perforations in the filmstrip, and an edge guide for the filmstrip adjacent said teeth, said teeth having a pitch corresponding substantially to the predetermined pitch;

means for rotating said member at a substantially constant velocity;

a first roller positioned adjacent said sprocket;

means for biasing said first roller toward said sprocket and toward said edge guide for guiding the filmstrip into engagement with said pair of surfaces and the one edge of the filmstrip into engagement with said edge guide;

a second roller positioned adjacent said sprocket generally opposite said first roller;

means for biasing said second roller toward said sprocket and toward said edge guide for guiding the filmstrip into engagement with said pair of surfaces and said edge guide and for guiding the filmstrip into an arcuate outgoing path;

said second roller cooperating with said first roller to urge a portion of the filmstrip into frictional engagement with said pair of surfaces and to establish a predetermined tension in the filmstrip portion, whereby movement of the filmstrip is effected by the surface friction between the filmstrip and said pair of surfaces and by successive ones of said teeth engaging the leading end of its respective perforation, the transfer of movement of the filmstrip by one tooth to the next tooth occurring when the perforation engaged by said one tooth is at least partially in the outgoing path and differences in pitch of said teeth and the perforations being compensated for by relatively frictional slippage between the web and said pair of surfaces.

9. A system in accordance with claim 8 wherein the transfer of movement of a filmstrip having perforations with a pitch less than said predetermined pitch occurs when the perforation engaged by said one tooth is in the outgoing path.

10. A system in accordance with claim 8 wherein the filmstrip is wrapped around at least one-half of the periphery of said sprocket.

11. In a system for detecting a sound signal recorded on a web having longitudinally spaced perforations defining a pitch which tends to vary from a predetermined pitch in response to temperature variations, shrinkage, etc., the combination comprising:

a rotatable driving member having a circumferential surface and a plurality of circumferentially spaced projections on said surface defining a pitch generally complemental to the predetermined pitch for engaging the web perforations;

means for rotating said member;

means for retaining a section of the web in frictional engagement with said circumferential surface of said driving member and for establishing a predetermined uniform tension in the section whereby movement of the web is effected by surface friction between the web and said circumferential surface and by engagement of at least one of said projections with at least one of the perforations and whereby differences in pitch of said projections and the perforations are compensated for by relative frictional slippage between the web and said circumferential surface; and means adjacent said driving member for detecting the sound signal recorded on the web, in the section of the web in engagement with said circumferential surface.

12. In a system for detecting a sound signal on a web as claimed in claim 2 wherein said means for retaining a section of the web in frictional engagement with said circumferential surface comprises:

a pair of rollers positioned adjacent said rotatable member on opposite sides thereof; and means for biasing said rollers toward said rotatable member and into engagement with the web to urge the section of the web into said frictional engagement with said circumferential surface of said rotatable member.

13. In a sound motion picture projector having a film gate through which film having longitudinally spaced perforations defining a pitch which tends to vary from a predetermined pitch in response to temperature variations, shrinkage, etc., is intermittently advanced, the combination comprising:

a rotatable driving sprocket for moving the film relative to the gate, said drive sprocket having a circumferential surface and a plurality of circumferentially-spaced teeth extending from said surface and defining a pitch generally corresponding to the pitch of the film for engaging the film perforations;

means for rotating said sprocket;

means for retaining a section of the film in frictional engagement with said circumferential surface of said sprocket and for establishing a predetermined uniform tension in the section whereby movement of the film is effected by surface friction between the film and said circumferential surface and by engagement of said teeth with said perforations and whereby differences in pitch of said teeth and the perforations are compensated for by relative frictional slippage between the film and said circumferential surface; and a sound head positioned adjacent said sprocket for detecting the sound signal recorded on the film, in the section of the film in engagement with said circumferential surface.

14. In a sound motion picture projector as claimed in claim 13 wherein said means for retaining a section of the film in frictional engagement with said circumferential surface comprises:
- a pair of rollers positioned adjacent said sprocket and on opposite sides thereof; and
- means for biasing said rollers toward said sprocket and into engagement with the film to urge the section of the film into frictional engagement with said circumferential surface of said sprocket.

References Cited
UNITED STATES PATENTS

| | | | |
|---|---|---|---|
| 1,589,139 | 6/1926 | Foley | 274—11 |
| 1,710,677 | 4/1929 | Cawley | 274—11 |
| 3,095,778 | 7/1963 | Warrick | 226—85 X |

ALLEN N. KNOWLES, *Primary Examiner.*

M. HENSON WOOD, Jr., *Examiner.*